United States Patent
Boesen et al.

(10) Patent No.: US 10,063,957 B2
(45) Date of Patent: Aug. 28, 2018

(54) EARPIECE WITH SOURCE SELECTION WITHIN AMBIENT ENVIRONMENT

(71) Applicant: BRAGI GmbH, München (DE)

(72) Inventors: Peter Vincent Boesen, München (DE); Darko Dragicevic, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/804,137

(22) Filed: Nov. 6, 2017

(65) Prior Publication Data

US 2018/0132030 A1    May 10, 2018

Related U.S. Application Data

(60) Provisional application No. 62/417,373, filed on Nov. 4, 2016.

(51) Int. Cl.
*H04R 29/00* (2006.01)
*H04R 1/10* (2006.01)
(Continued)

(52) U.S. Cl.
CPC .......... *H04R 1/1041* (2013.01); *G06F 3/017* (2013.01); *G06F 3/167* (2013.01); *H04R 1/1016* (2013.01);
(Continued)

(58) Field of Classification Search
CPC ...................................... H04R 29/00
See application file for complete search history.

(56) References Cited

U.S. PATENT DOCUMENTS

| 2,325,590 A | 8/1943 | Carlisle et al. |
| 2,430,229 A | 11/1947 | Kelsey |

(Continued)

FOREIGN PATENT DOCUMENTS

| CN | 204244472 U | 4/2015 |
| CN | 104683519 A | 6/2015 |

(Continued)

OTHER PUBLICATIONS

Wikipedia, "Wii Balance Board", "https://en.wikipedia.org/wiki/Wii_Balance_Board", 3 pages, (Jul. 20, 2017).
(Continued)

*Primary Examiner* — Olisa Anwah
(74) *Attorney, Agent, or Firm* — Goodhue, Coleman & Owens, P.C.

(57) ABSTRACT

A wireless earpiece includes a wireless earpiece housing, at least one microphone for detecting ambient environment sound, and a processor disposed within the wireless earpiece housing, the processor configured to distinguish between two or more sources of sound within the ambient environment sound. The wireless earpiece further includes a user interface operatively connected to the processor. The processor is configured to receive user input through the user interface to select one of the sources of sound within the ambient environment sound and wherein the processor is configured to process the ambient environment sound to emphasize portions of the ambient environment sound generated by the one of the sources of the ambient environment sound selected by the user to produce a modified sound. The earpiece may further include a speaker operatively connected to the processor to reproduce the modified sound.

5 Claims, 5 Drawing Sheets

(51) Int. Cl.
*G06F 3/01* (2006.01)
*G06F 3/16* (2006.01)

(52) U.S. Cl.
CPC ......... *H04R 1/1083* (2013.01); *H04R 1/1091* (2013.01); *H04R 2420/07* (2013.01)

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |

(56) References Cited

U.S. PATENT DOCUMENTS

| | | |
|---|---|---|
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0187163 A1 | 8/2008 | Goldstein et al. |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2013/0316642 A1 | 11/2013 | Newham |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1* | 2/2015 | Chen .................. H04R 1/1041 381/74 |
| 2015/0110587 A1 | 4/2015 | Hori |
| 2015/0148989 A1 | 5/2015 | Cooper et al. |
| 2015/0181356 A1* | 6/2015 | Krystek ............... H04R 25/558 381/315 |
| 2015/0245127 A1 | 8/2015 | Shaffer |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0034249 A1* | 2/2016 | Lee ........................ G06F 3/167 704/275 |
| 2016/0071526 A1* | 3/2016 | Wingate ............... G10L 21/028 704/233 |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0162259 A1* | 6/2016 | Zhao .................... G06F 3/0484 715/728 |
| 2016/0209691 A1* | 7/2016 | Yang .................... G02F 1/1368 |
| 2016/0353196 A1 | 12/2016 | Baker et al. |
| 2016/0360350 A1 | 12/2016 | Watson et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0142511 A1 | 5/2017 | Dennis |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0263236 A1 | 9/2017 | Boesen et al. |
| 2017/0273622 A1 | 9/2017 | Boesen |
| 2017/0280257 A1* | 9/2017 | Gordon ................ H04R 25/50 |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |

(56) References Cited

FOREIGN PATENT DOCUMENTS

| WO | 2014046602 A1 | 3/2014 |
|----|---------------|--------|
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Akkermans, "Acoustic Ear Recognition for Person Identification", Automatic Identification Advanced Technologies, 2005 pp. 219-223.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, a Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, California (2017).
International Search Report & Written Opinion, PCT/EP2016/070231 (dated Nov. 18, 2016).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).

\* cited by examiner

EARPIECE WITH SOURCE SELECTION WITHIN AMBIENT ENVIRONMENT

PRIORITY STATEMENT

This application claims priority to U.S. Provisional Patent Application No. 62/417,373 filed on Nov. 4, 2016 titled Earpiece with Source Selection within Ambient Environment all of which is hereby incorporated by reference in its entirety.

FIELD OF THE INVENTION

The present invention relates to wearable devices. Particularly, the present invention relates to wireless earpieces. More particularly, but not exclusively, the present invention relates to wireless earpieces, which allow a user to selectively control the ambient sound level of the wireless earpieces.

BACKGROUND

A number a situations exist in which an individual is acoustically isolated from an external environment. One of the issues with earpieces is they may block the external auditory canal thereby preventing a user from hearing ambient sounds. Sometimes, this is desired and beneficial, but sometimes it is not. The isolation often results in inefficiency or inconvenience. One primary isolation situation arises from the use of earpieces. A wide variety of traditional earpieces exist for noise abatement or for listening to an audio source or communication. Earpieces can be utilized for maintaining communication in a high ambient sound environment, such as in an aircraft cockpit, stadium, and so forth.

Therefore, a need exists for the development of methods for controlling acoustic isolation, so important events are not missed and non-important noises can be properly identified and ignored. What is needed is a system and method of substantially preventing ambient sounds from reaching the user's tympanic membranes while providing the user with the option to permit the ambient sounds the user desires to listen to.

SUMMARY

Therefore, it is a primary object, feature, or advantage of the present invention to improve over the state of the art.

It is a further object, feature, or advantage of the present invention to provide a wireless earpiece which identifies different sound sources and allows the user to select one or more of the sound sources to hear while filtering out or attenuating other sound sources.

One or more of these and/or other objects, features, or advantages of the present invention will become apparent from the specification and claims follow. No single embodiment need provide each and every object, feature, or advantage. Different embodiments may have different objects, features, or advantages. Therefore, the present invention is not to be limited to or by an objects, features, or advantages stated herein.

According to one aspect, a wireless earpiece is provided. The wireless earpiece includes a wireless earpiece housing, at least one microphone for detecting ambient environment sound, and a processor disposed within the wireless earpiece housing, the processor configured to distinguish between two or more sources of sound within the ambient environment sound. The wireless earpiece further includes a user interface operatively connected to the processor. The processor is configured to receive user input through the user interface to select one of the sources of sound within the ambient environment sound and wherein the processor is configured to process the ambient environment sound to emphasize portions of the ambient environment sound generated by the one of the sources of the ambient environment sound selected by the user to produce a modified sound. The earpiece may further include a speaker operatively connected to the processor to reproduce the modified sound. The processor may be further configured to identify direction of the two or more sound sources within the ambient environment sound. The user interface may further include an inertial sensor and the user may then select the one of the sources of sound within the ambient environment sound by moving the user's head toward the direction of the one of the sources of sound. The user interface may provide for voice input from the user. The user interface may include a gestural interface. The processor may include one or more digital signal processors. A left wireless earpiece and a right wireless earpiece may in operative communication with one another.

According to another aspect, a method is provided for performing source selection within an ambient environment using a wireless earpiece comprising an earpiece housing, a processor disposed within the earpiece housing, at least one microphone operative connected to the processor, and at least one speaker operatively connected to the processor. The method may include steps of detecting ambient environment sound using the at least one microphone, processing the ambient environment sound at the processor to distinguish between two or more sources of sound within the ambient environment sound, receiving a selection of one of the sources of sound from a user of the earpiece, processing the ambient environment sound to emphasize portions of the ambient environment sound generated by the one of the sources of sound selected by the user to produce a modified sound, and producing the modified sound at the at least one speaker. The wireless earpiece may further include a gestural interface operatively connected to the processor and wherein the step of receiving the selection of one of the sources of sound from the user of the earpiece is performed using the gestural interface. The wireless earpiece may further include an inertial sensor operatively connected to the processor and wherein the step of receiving the selection of one of the sources of sound from the user of the earpiece is performed using the inertial sensor.

BRIEF DESCRIPTION OF THE DRAWINGS

Illustrated embodiments of the disclosure are described in detail below with reference to the attached drawing figures, which are incorporated by reference herein.

DETAILED DESCRIPTION

Figure 1:
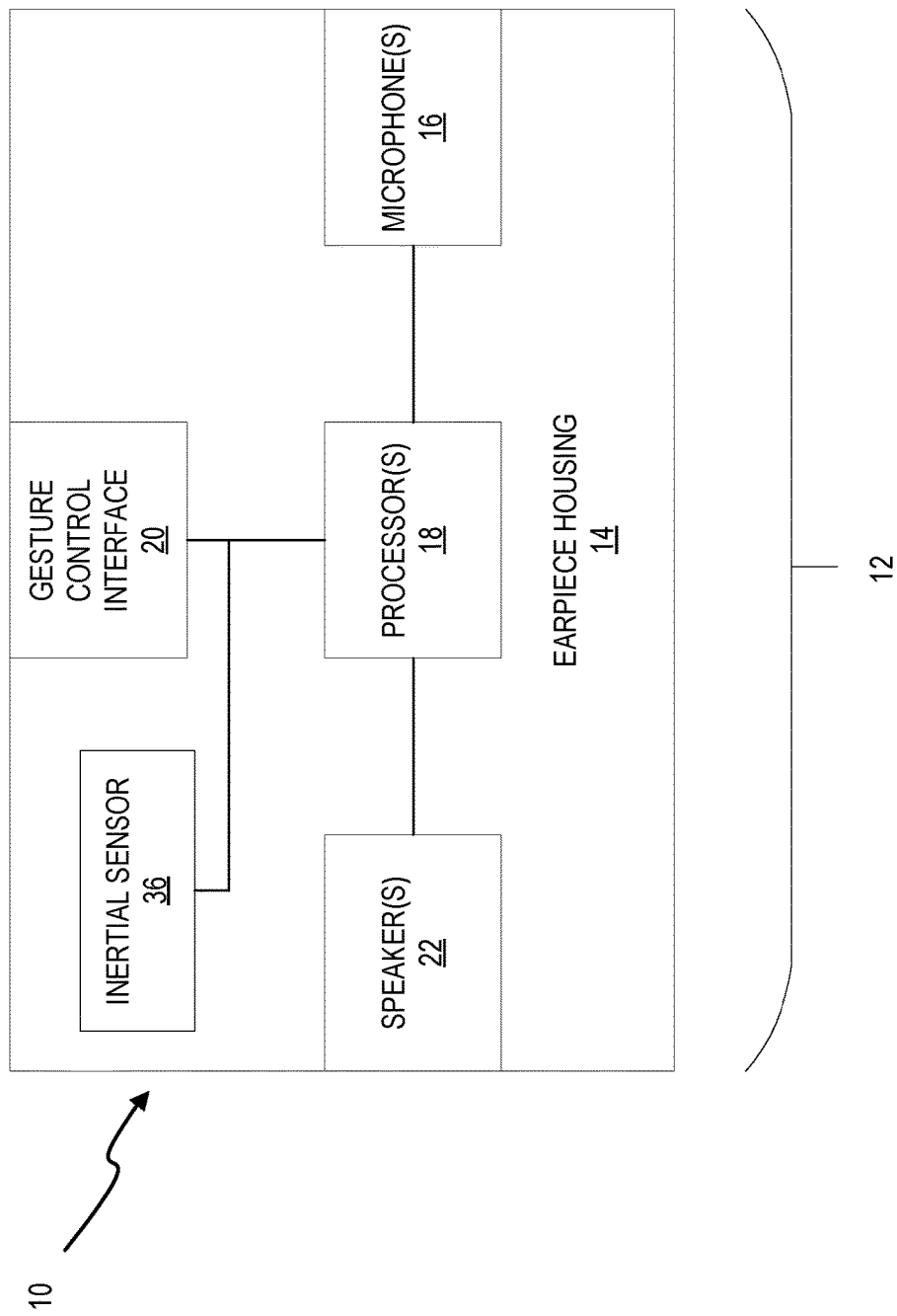
FIG. 1 includes a block diagram in accordance with an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of source selection of ambient sound for wireless earpieces, it is fully contemplated embodiments of the present invention could be used in most any electronic communications device without departing from the spirit of the invention.

In one implementation, a system includes an earpiece having an earpiece housing. A microphone can be mounted onto the earpiece housing, and configured to receive ambient sound. A processor can be disposed within the earpiece housing and operatively connected to each microphone. The processor is configured to process one or more ambient sounds. A gesture control interface can be mounted onto the earpiece housing and operatively connected to the processor. The gesture control interface is configured to allow a user to control the processing of one or more ambient sounds received by the processor using a gesture. A speaker can be mounted onto the earpiece housing and operatively connected to the processor. The speaker is configured to communicate one or more ambient sounds received from the processor.

One or more of the following features may be included. The earpiece housing may be composed of soundproof materials. The earpiece may comprise a set of earpieces, which may further comprise a left earpiece and a right earpiece. Each earpiece may be configured to substantially encompass an external auditory canal of a user and may be further configured to substantially fit within the external auditory canal. The gesture control interface may be configured to prompt a user with a menu upon receiving a gesture. The gesture control interface may be further configured to prompt the user with a menu upon receiving a voice command from one or more microphones. Each menu may comprise at least one option selectable by the user using a gesture or a voice command. A mobile device may be operatively connected to the earpiece and may be configured to prompt the user with a menu upon receiving a user input. The gesture control interface may be configured to control one or more ambient sounds received by one or more microphones by instructing one or more microphones to filter out one or more ambient sounds. The gesture control interface may be configured to control one or more ambient sounds received by one or more microphones by instructing one or more processors to communicate one or more ambient sounds to the speaker. One or more gestures may include one or more taps on the gesture control interface, one or more swipes, or holds, or other gestures. The processor may be configured to communicate an audio signal to the speaker.

In another implementation, a method includes receiving, via one or more microphones, one or more ambient sounds, conveying, via one or more microphones, each ambient sound to a processor, processing the ambient sounds using the processor based on one or more sound sources selected by the user, and communicating the ambient sounds using a speaker.

One or more of the following features may be included. One or more non-ambient sounds may be provided, which may be stored within the earpiece or received from one or more transceivers. The reception of one or more ambient sounds may further include receiving one or more ambient sounds through a bone microphone positioned. Ambient sound processing may be controlled using one or more voice commands.

FIG. 1 illustrates a block diagram of the system 10 having at least one earpiece 12 having an earpiece housing 14. A microphone 16 is positioned to receive ambient sound. One or more processors 18 may be disposed within the earpiece housing 14 and operatively connected to microphone 16. A gesture control interface 20 is operatively connected to the processor 18. The gesture control interface 20 configured to allow a user to control the processing of the ambient sounds such as by selecting a source of ambient sounds which the user wishes to listen to. An inertial sensor 36 is also shown which is operatively connected to the one or more processors. One or more speakers 22 may be positioned within the earpiece housing 14 and configured to communicate the ambient sounds desired by the user. The earpiece housing 14 may be composed of soundproof materials to improve audio transparency or any material resistant to shear and strain and may also have a sheath attached in order to improve comfort, sound transmission or reduce the likelihood of skin or ear allergies. In addition, the earpiece housing 14 may also substantially encompass the external auditory canal of the user in order to substantially reduce or eliminate external sounds to further improve audio transparency. The housing 14 of each wearable earpiece 12 may be composed of any material or combination of materials, such as metals, metal alloys, plastics, or other polymers having substantial deformation resistance One or more microphones 16 may be positioned to receive one or more ambient sounds. The ambient sounds may originate from the user, a third party, a machine, an animal, another earpiece, another electronic device or even nature itself. The types of ambient sounds received by the microphones 16 may include words, combination of words, sounds, combinations of sounds or any combination of the aforementioned. The ambient sounds may be of any frequency and need not necessarily be audible to the user.

The processor 18 is the logic controls for the operation and functionality of the earpiece(s) 12. The processor 18 may include circuitry, chips, and other digital logic. The processor 18 may also include programs, scripts and instructions, which may be implemented to operate the processor 18. The processor 18 may represent hardware, software, firmware or any combination thereof. In one embodiment, the processor 18 may include one or more processors. The processor 18 may also represent an application specific integrated circuit (ASIC), system-on-a-chip (SOC) or field programmable gate array (FPGA).

The processor 18 may also process gestures to determine commands or selections implemented by the earpiece 12. Gestures such as taps, double taps, triple taps, swipes, or holds may be received. The processor 18 may also process movements by the inertial sensor 36. The inertial sensor 36 may be a 9-axis inertial sensor which may include a 3-axis accelerometer, 3-axis gyroscope, and 3-axis magnetometer. The inertial sensor 36 may serve as a user interface. For example, a user may move their head and the inertial sensor may detect the head movements. In one embodiment, a user may select which sound source they wish to listen to by directing their head to point at the desired sound source.

In one embodiment, the processor 18 is circuitry or logic enabled to control execution of a set of instructions. The processor 18 may be one or more microprocessors, digital signal processors, application-specific integrated circuits (ASIC), central processing units or other devices suitable for controlling an electronic device including one or more hardware and software elements, executing software, instructions, programs, and applications, converting and processing signals and information and performing other related tasks. The processor may be a single chip or integrated with other computing or communications components.

Figure 2:
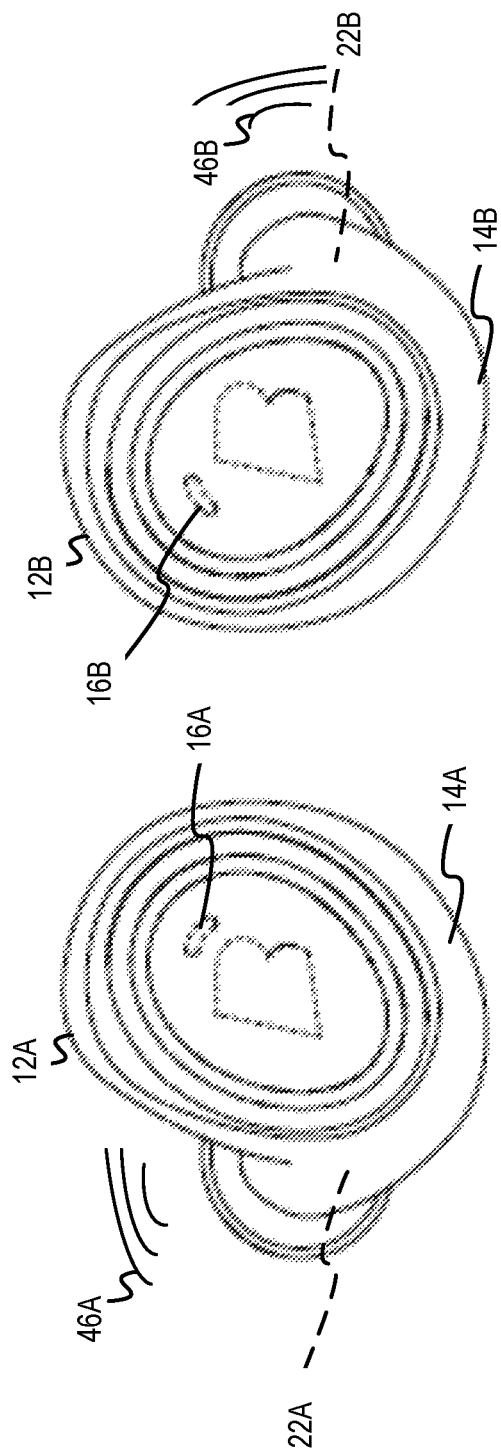
FIG. 2 illustrates a system including a left earpiece and a right earpiece in accordance with an embodiment of the present invention.
Figure 3:
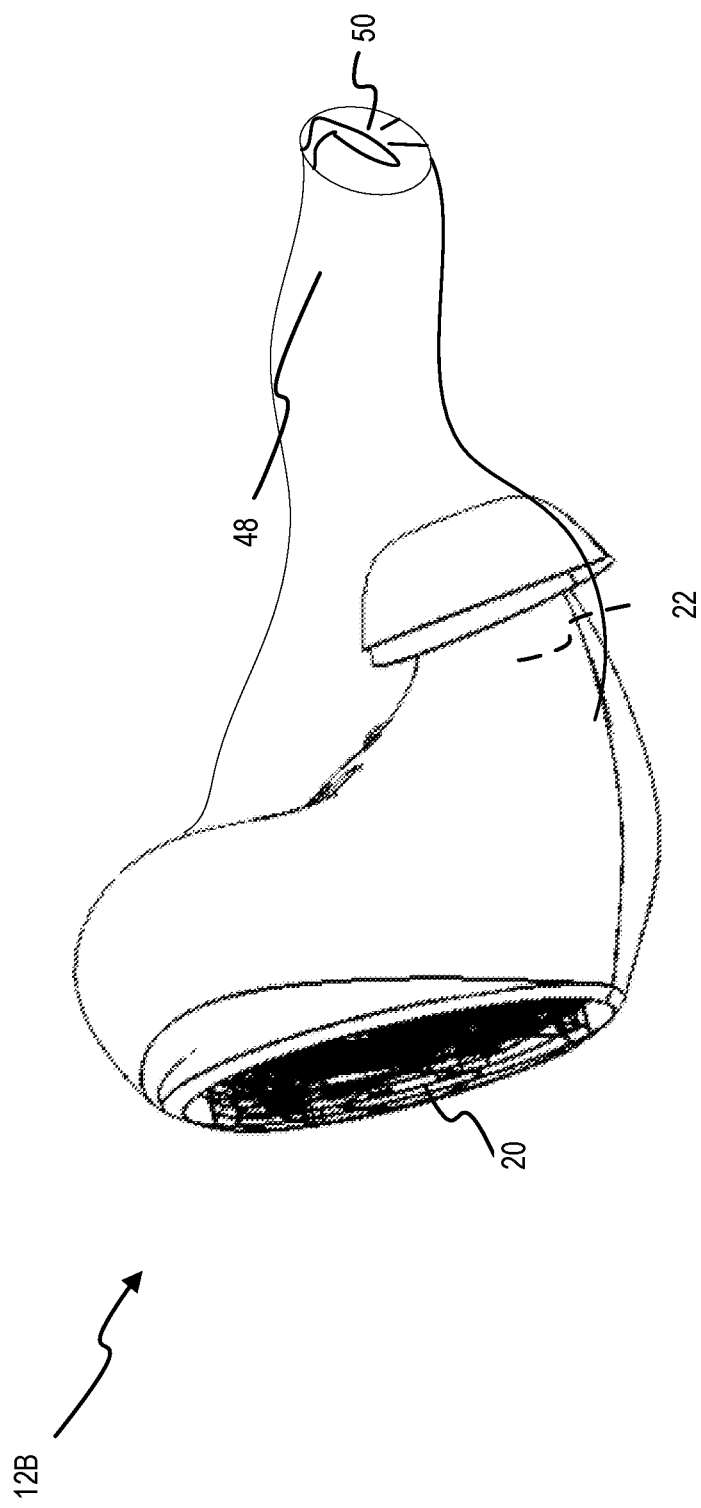
FIG. 3 illustrates a right earpiece and its relationship to a user's ear in accordance with an embodiment of the present invention.
Figure 4:
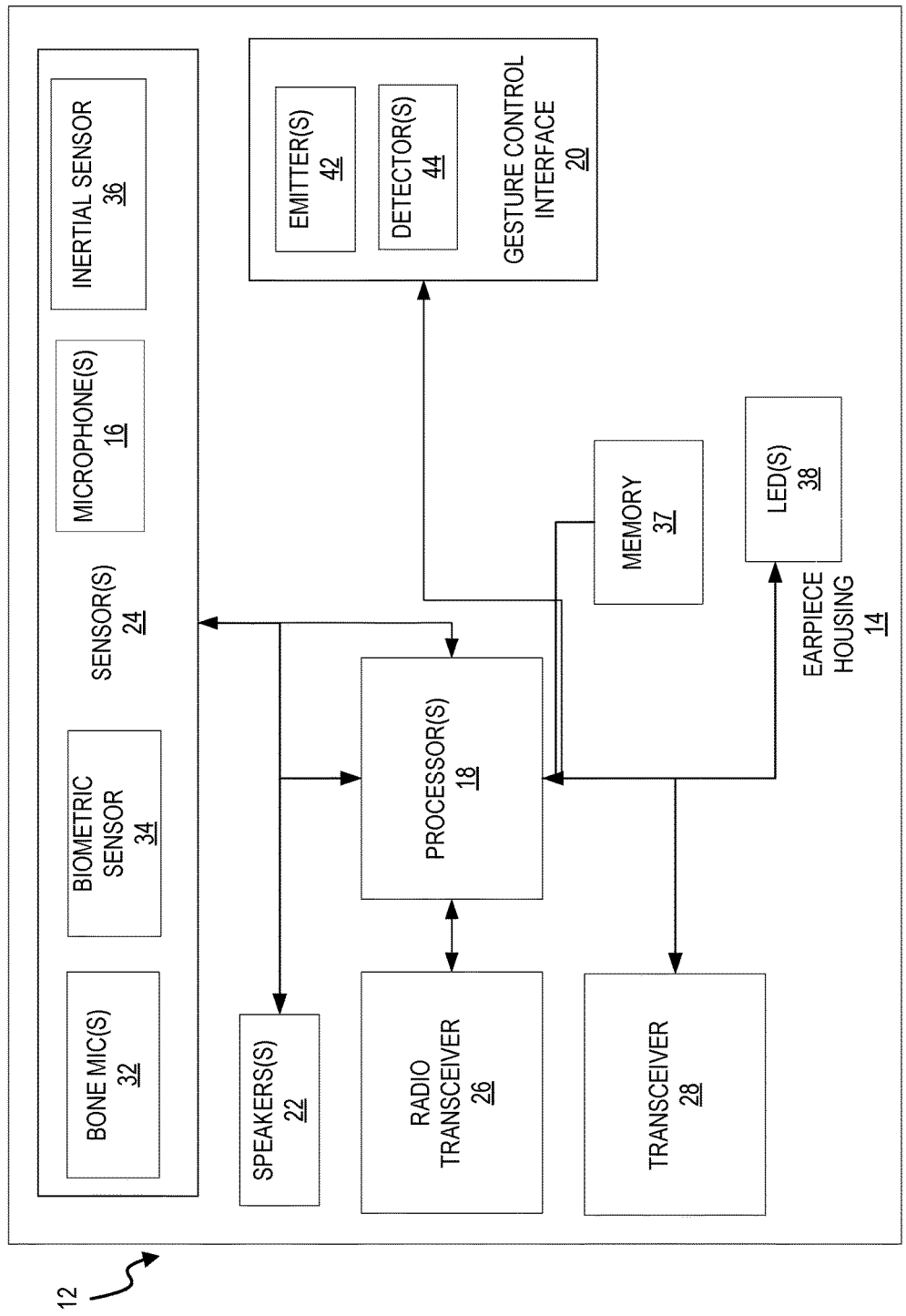
FIG. 4 includes an expanded block diagram of the system in accordance with an embodiment of the present invention.

A gesture control interface 20 is mounted onto the earpiece housing 14 and operatively connected to the processor 18 and configured to allow a user to select one or more sound sources using a gesture. The gesture control interface 20 may be located anywhere on the earpiece housing 14 conducive to receiving a gesture and may be configured to receive tapping gestures, swiping gestures, or gestures which do not make contact with either the gesture control interface 20 or another part of the earpiece 12. FIG. 2 illustrates a pair of earpieces which includes a left earpiece 12A and a right earpiece 12B. The left earpiece 12A has a left earpiece housing 14A. The right earpiece 12B has a right earpiece housing 14B. A microphone 16A is shown on the left earpiece 12A and a microphone 16B is shown on the right earpiece 12B. The microphones 16A and 16B may be positioned to receive ambient sounds. Additional microphones may also be present. Speakers 22A and 22B are configured to communicate modified sounds 46A and 46B after processing. The modified sounds 46A and 46B may be communicated to the user FIG. 3 illustrates a side view of the right earpiece 12B and its relationship to a user's ear. The right earpiece 12B may be configured to isolate the user's ear canal 48 from the environment so that the user does not hear the environment directly, but may hear a reproduction of the environmental sounds as modified by the earpiece 12B which is directed towards the tympanic membrane 50 of the user. There is a gesture control interface 20 shown on the exterior of the earpiece. FIG. 4 is a block diagram of an earpiece 12 having an earpiece housing 14, and a plurality of sensors 24 operatively connected to one or more processors 18. The one or more sensors may include one or more bone microphones 32 which may be used for detecting speech of a user. The sensors 24 may further include one or more biometric sensors 34 which may be used for monitoring physiological conditions of a user. The sensors 24 may include one or more microphones 16 which may be used for detecting sound within the ambient environment of the user. The sensors 24 may include one or more inertial sensors 36 which may be used for determining movement of the user such as head motion of the user used to select one or more sound sources within the ambient environment. A gesture control interface 20 is also operatively connected to the one or more processors 18. The gesture control interface 20 may be implemented in various ways including through capacitive touch or through optical sensing. The gesture control interface 20 may include one or more emitters 42 and one or more detectors 44. Thus, for example, in one embodiment, light may be emitted at the one or more emitters 42 and detected at the one or more detectors 44 and interpreted to indicate one or more gestures being performed by a user. One or more speakers 22 are also operatively connected to the processor 18. A radio transceiver 26 may be operatively connected to the one or more processors 18. The radio transceiver may be a BLUETOOTH transceiver, a BLE transceiver, a Wi-Fi transceiver, or other type of radio transceiver. A transceiver 28 may also be present. The transceiver 28 may be a magnetic induction transceiver such as a near field magnetic induction (NFMI) transceiver. Where multiple earpieces are present, the transceiver 28 may be used to communicate between the left and the right earpieces. A memory 37 is operatively connected to the processor and may be used to store instructions regarding sound processing, user settings regarding selections, or other information. One or more LEDs 38 may also be operatively connected to the one or more processors 18 and may be used to provide visual feedback regarding operations of the wireless earpiece.

Figure 5:
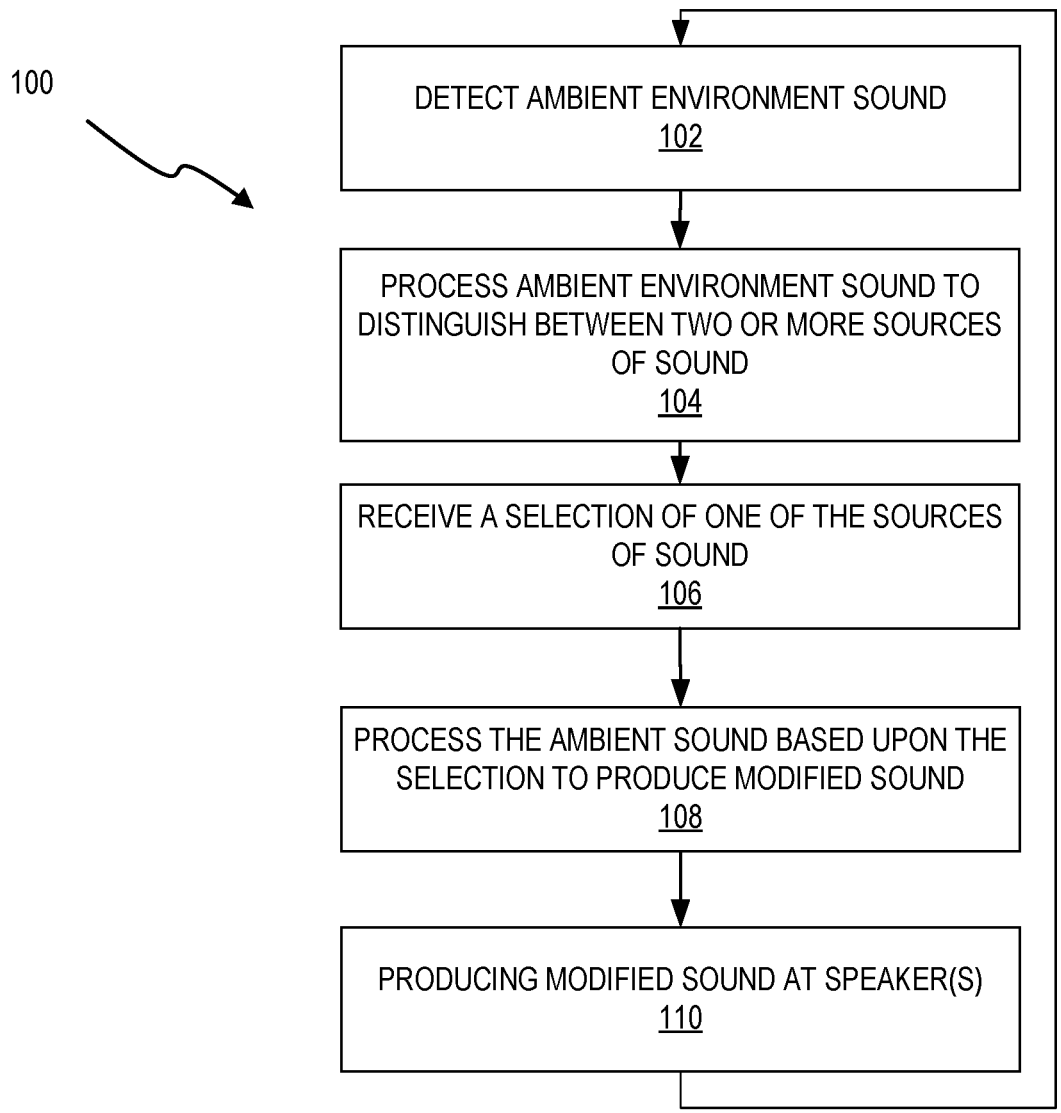
FIG. 5 includes a flowchart of one embodiment of the method in accordance with an embodiment of the present invention.

FIG. 5 illustrates one example of a method 100. In step 102, ambient environment sound is detected such as by using one or more microphones of a single earpiece or using one or more microphones of each earpiece within a set of earpieces which includes both a left earpiece and a right earpiece. In step 104, the ambient environment sound is processed to distinguish between two or more sources of sound. This processing may occur in various ways using any number of different types of algorithms. For example, a segmentation algorithm may be used in order to segment the ambient environment sound into different sources. Feature extraction algorithms may be applied in order to extract different features of the ambient environment sound associated with different sources. Where more than one earpiece is used or where more than one microphone is used on a single wireless earpiece, additional algorithms may be used to determine the direction that a sound source is coming from. The sound source may be one of any number of different types of sound source. The sound source may be another individual who is talking. The sound source may be a television, radio, or computer. The sound source may be any person, animal, or object that emits sounds.

In step 106, a selection of one of the sources of sound may be received. This process may occur in any number of different ways. For example, where the user interface of the wireless earpiece includes an inertial sensor, a user may turn their head to the source of sound the user wishes to listen to. The processor may then select one or more sounds emanating from the direction to which the user is facing by emphasizing the selected one or more sounds or deemphasizing one or more non-selected sounds. A sound source may be emphasized in various ways including increasing amplitude or volume of a particular sound source or decreasing the amplitude or volume of other sound sources, or otherwise attenuating or suppressing other sound sources. In some cases other sound sources may be filtered out in other ways such as based on frequency of the sounds. Indeed, any number of filters may be applied by the processor in order to emphasize one or more selected sounds. In another embodiment, a user may select one of the sound sources through use of the gestural interface. For example, after identifying different sources of sound, the processor may automatically select one of the sources of sound, modify the ambient sound to emphasize that selection and reproduce it and then the user may confirm the selection or deny the selection through use of the gestural interface. If the user denies the selection of the source of sound, the earpiece may select a different one of the sources of sound and generate that modified sound for the user for that source, and repeat the process until the user has agreed upon the selected sound source. Once a selection of one of the sources of sound has been made in step 106, in step 108 the ambient sound is processed based upon the selection in order to produce modified sound. The modified sound produced is a modified ambient environment sound that emphasizes a particular sound source selection made by the user such as by treating sounds from other sources as background sounds and filtering those sounds out, by increasing the amplitude of sound from the selected sound source or otherwise. In step 110, the modified sound may then be produced at the one or more speakers of the earpiece. Thus, in this manner the earpiece may be used to provide for a source selection within the ambient environment sound.

Therefore, various methods, systems, and apparatus have been shown and described. Although various embodiments or examples have been set forth herein, it is to be understood the present invention contemplates numerous options, variations, and alternatives as may be appropriate in a particular application or environment.

What is claimed is:

1. A method for performing source selection within an ambient environment using a wireless earpiece comprising an earpiece housing, a processor disposed within the earpiece housing, at least one microphone operative connected to the processor, and at least one speaker operatively connected to the processor, the method comprising steps of:
   detecting ambient environment sound using the at least one microphone;
   processing the ambient environment sound at the processor to distinguish between two or more sources of sound within the ambient environment sound;
   receiving a selection of one of the sources of sound from a user of the earpiece via a user interface operatively connected to the processor;
   selecting a different source of sound from the two or more sources of sound within the ambient environment sound in response to a denial of the selection of one of the sources of sound by the user;
   processing the ambient environment sound to emphasize portions of the ambient environment sound generated by the one of the sources of sound selected by the user to produce a modified sound; and
   producing the modified sound at the at least one speaker.

2. The method of claim 1 wherein the processing of the ambient environment sound at the processor to distinguish between two or more sources of sound is performed using a feature extraction algorithm for extracting different features of the ambient environment sound.

3. The method of claim 1 wherein the wireless earpiece further comprises an inertial sensor operatively connected to the processor and wherein the step of receiving the selection of one of the sources of sound from the user of the earpiece is performed using the inertial sensor.

4. The method of claim 1 wherein the processing of the ambient environment sound at the processor to distinguish between two or more sources of sound within the ambient environment sound comprises segmenting the ambient environment sound into different sources using a segmentation algorithm.

5. The method of claim 1 wherein the selection of one of the sources of sound from the user comprises a non-contact gesture.

\* \* \* \* \*